United States Patent [19]

Lo et al.

[11] Patent Number: 5,062,056
[45] Date of Patent: Oct. 29, 1991

[54] APPARATUS AND METHOD FOR TRACKING A TARGET

[75] Inventors: Thomas K. Lo, Temple City; Nam D. Banh, Canoga Park; Timothy T. Bohn, Simi Valley; Jack M. Sacks, Thousand Oaks, all of Calif.

[73] Assignee: Hughes Aircraft Company, Los Angeles, Calif.

[21] Appl. No.: 423,301

[22] Filed: Oct. 18, 1989

[51] Int. Cl.[5] ............... G01S 13/00; H04N 5/225; G06F 7/80
[52] U.S. Cl. .................. 364/516; 364/423; 235/411; 358/126
[58] Field of Search .......... 364/516, 423; 358/125, 358/126, 105; 235/411, 412; 382/1; 342/77, 159

[56] References Cited

U.S. PATENT DOCUMENTS

| | | | |
|---|---|---|---|
| 4,133,004 | 1/1979 | Fitts | 350/125 |
| 4,220,967 | 9/1980 | Ichida et al. | 358/105 |
| 4,272,783 | 6/1981 | Warnstam et al. | 364/516 |
| 4,409,661 | 10/1983 | Romanski | 364/516 |
| 4,718,028 | 1/1988 | Gussin et al. | 364/516 |
| 4,719,584 | 1/1988 | Rue et al. | 364/516 |
| 4,739,401 | 4/1988 | Sacks et al. | 382/1 |
| 4,796,187 | 1/1989 | North | 364/516 |
| 4,825,055 | 4/1989 | Pollock | 364/516 |
| 4,849,906 | 7/1989 | Chodos et al. | 364/516 |
| 4,855,932 | 8/1989 | Cangiani et al. | 364/516 |

Primary Examiner—Joseph L. Dixon
Attorney, Agent, or Firm—C. D. Brown; R. M. Heald; W. K. Denson-Low

[57] ABSTRACT

Target tracking capability is provided by a synergistic tracker system (5) which includes both a correlation tracker (30) and an object tracker (40) for processing sensor data input (10) and for generating tracking error signals (80). The operation of the synergistic tracker system is controlled by a central processing unit (70). The system operates by first correlating a reference region image with a portion of a current digitized image provided by an analog to digital converter (20). Secondly, the object tracker provides a precisely defined trackpoint for an object within the current image. The correlation tracker stabilizes and limits the portion of the digitized image that the object tracker must operate upon. Stabilizing and limiting this portion of the digitized image reduces the object tracker's sensitivity to background clutter and sensitivity to a loss of lock induced by sensor motion. The object tracker provides a non-recursive update for the correlation's reference region image. The correlation tracker and the object tracker are used simultaneously and cooperatively so that the strengths of one tracker are used to overcome the weaknesses of the other. A method of tracking a target immersed in background clutter is also disclosed.

20 Claims, 3 Drawing Sheets

Scene $F_{i+1}$

Scene $F_{i+1}$

APPARATUS AND METHOD FOR TRACKING A TARGET

BACKGROUND OF THE INVENTION

1. Technical Field

The present invention relates to target tracking systems, and more particularly deals with a tracking system that simultaneously uses both a correlation tracker and an object tracker.

2. Discussion

The functional purpose of a tracking system is to continuously track one or more selected targets in a scene. A tracking system must continuously maintain lock on, or track a target, even under unfavorable scene conditions. Tracking systems devised in the past have utilized object trackers and correlation trackers but have used them independently of one another. When operating independently both types of trackers have disadvantages which render them susceptible to a loss of lock or a break in target tracking.

An object tracker is one which tracks discrete targets individually and explicitly. Tracking is achieved by forming a closely fitting two-dimensional exclusionary enclosure around each target to be tracked in a digitized image. Such a target enclosure is known as a track gate. A track gate isolates a tracked target from other potentially interfering objects in the digitized image. An object tracker operates upon the digitized image within the track gate to generate a precisely defined target trackpoint. In some cases the precisely defined target trackpoint represents the centroid of the silhouette of the tracked target. Potentially interfering objects are generally referred to as background clutter. Tracking gate growth algorithms are provided within an object tracker to enable the track gate to independently and continuously adapt to the changing size and aspect ratio of targets tracked by the object tracker.

In an object tracker, useful information is derived only from the digitized image enclosed within the track gate. An object tracker is sensitive to the adverse effects of background clutter. The tracked target may be lost when clutter enters the track gate and merges with the tracked target, or obscures a significant part of the tracked target. Clutter can cause a target trackpoint to wander away from the initially acquired target if the size of the track gate is too large. The primary mechanism responsible for "gate stealing" or an object tracker breaking its "lock" on a target, is the track gate growth algorithm which is necessary to accommodate dimensional changes of a target over a series of images. The target trackpoint may also be lost if there is severe input sensor LOS motion "jerking" the target out of the track gate. Experience with object trackers has shown them to be relatively susceptible to clutter induced loss of lock or gate stealing. Whenever this phenomenon occurs, recovery from the ensuing loss of lock is nearly impossible.

The second type of tracker used independently in the past is a correlation tracker. A correlation tracker differs conceptually and fundamentally from an object tracker. A correlation tracker operates by repeatedly and periodically comparing a currently digitized image to a stored reference region image or "template image". A point whose coordinates are known with respect to the center of the template image is defined to be a background reference point. The correlation tracker locates the background reference point in the currently digitized image by finding a portion of the current image which matches the reference image region. A correlation tracker generally tracks patterns rather than discrete or individual targets. Trackable patterns include background details as well as patterns or groups of specific objects. Any type of scene material, texture or structure may be tracked providing that the pattern is unique and temporally repeatable. A large discrete target can be tracked explicitly by a correlation tracker only if the target possesses a unique and visible pattern of internal texture or edge detail. Although a correlation tracker cannot track a small stationary target explicitly, such a target can be tracked implicitly as part of a larger scene.

A correlation tracker operating independently unfortunately has its share of disadvantages. A correlation tracker can only track accurately if its reference region image matches up well to a portion of the current digitized image. Since a correlation tracker tracks by matching a stored reference region image with a current digitized image, it cannot track a changing scene indefinitely without renewing or "updating" its reference region image with current data. When a correlation tracker's reference region image data no longer matches data from the current digitized image, the correlation tracker's accuracy deteriorates. However, the process of updating a reference region image introduces error or "noise" into the correlation tracker. Typically, the error or noise is accumulated and does not have a zero mean value. Therefore, a form of "Brownian motion", or "random walk" is introduced into the background reference point generated by a correlation tracker. The amount of error, or the extent of the random walk problem, depends directly on the average update rate of the reference region image. The accumulated error may ultimately cause the correlation tracker's background reference point to drift away from its original position in the scene. A correlation tracker will suffer a loss of lock if the tracked scene is jerked out of the field of view of the input sensor, or if the live scene changes so rapidly that the process of updating the reference region image cannot accommodate the change. The difficulty with a rapidly changing scene can be overcome by frequently updating the correlation tracker's reference region image. The difficulty with severe sensor motion can be overcome if the tracked scene later enters the field of view of the input sensor, because correlation tracking will resume instantaneously, with the same background reference point as before. While it is possible to overcome these difficulties, it would be preferable not to have to deal with them in the first place.

SUMMARY OF THE INVENTION

According to the present invention, a synergistic tracking system is provided which employs both a correlation tracker and an object tracker. The two trackers are employed by the tracking system in a manner such that the disadvantages of each individual tracker are substantially reduced and such that more than a mere combination of target trackpoint error signals is achieved. The synergistic tracking system includes a central processing unit to control and coordinate the operation of the two trackers.

The synergistic tracking system employs a correlation tracker which finds the best match between a reference region image and a current digitized image. Once the best match is found, a background reference point is generated by the correlation tracker. The tracker system then generates a first estimated track gate for the current position of the target. The system also includes an object tracker which receives the first estimated track gate derived from the correlation tracker's output. The object tracker calculates a second precisely defined target trackpoint and generates target size information. The tracker system uses the second precisely defined target trackpoint and the target size information from the object tracker to redefine the center of the reference region image to be used by the correlation tracker during the processing of a subsequent digitized image.

BRIEF DESCRIPTION OF THE DRAWINGS

The various advantages of the present invention will become apparent to those skilled in the art by reading the following specification and by reference to the drawings in which:

FIG. 6 illustrates the processing intervals of the two trackers of the synergistic tracker system.

DETAILED DESCRIPTION OF THE PREFERRED EMBODIMENT

Figure 1:
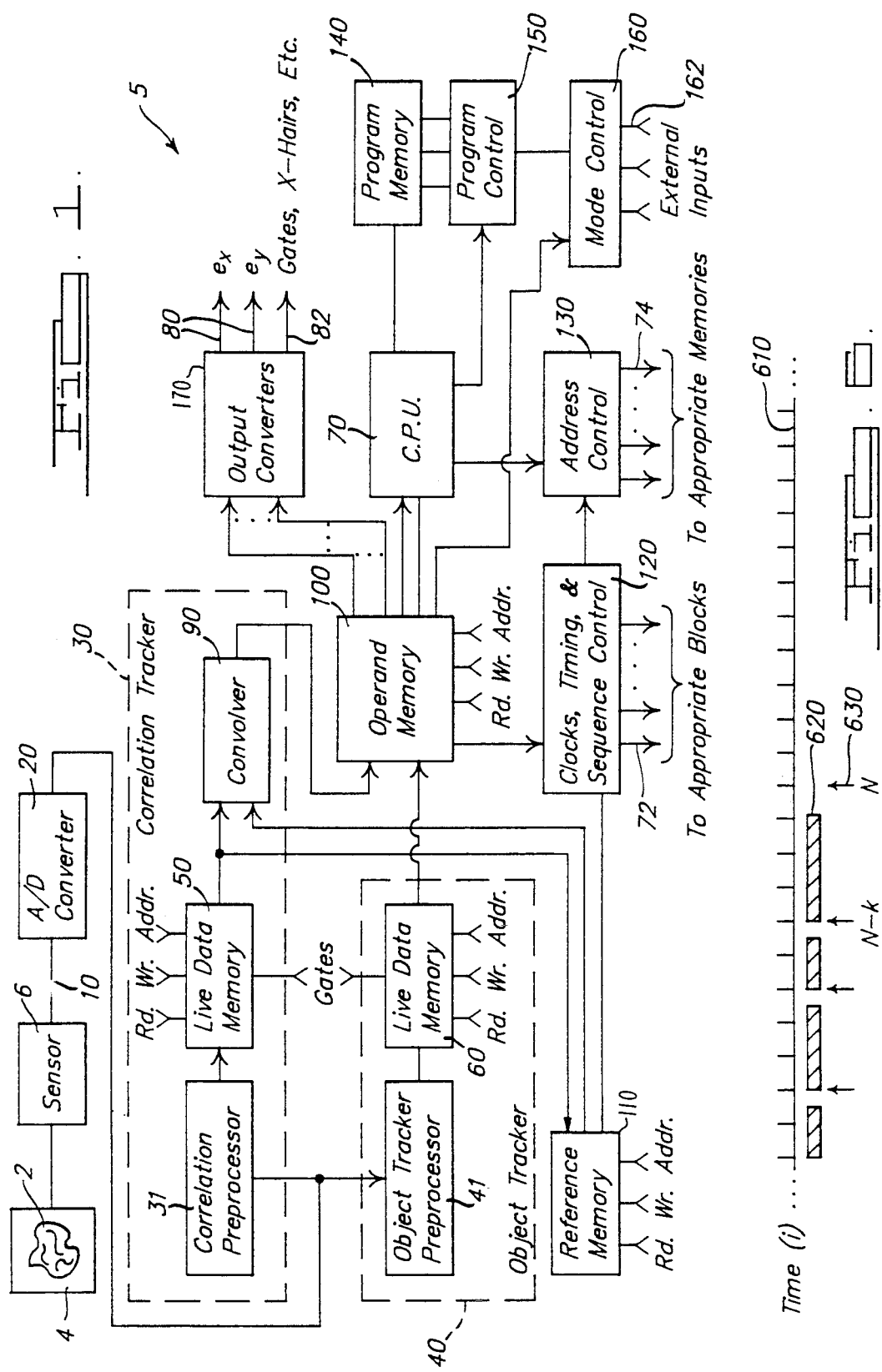
FIG. 1 is a block diagram of a video tracking system made in accordance with the teachings of the present invention.

The synergistic tracking system operates by utilizing both a correlation and an object tracker to analyze a digitized image from a scene. Tracking begins when an operator initializes the system to a scene and a target of interest. Each time new data from the live scene is received by the system, both trackers work cooperatively. First, the correlation processor matches the data in the reference region image with portions of the current digitized image. When the best match is found, the correlation processor generates a background reference point. Once a background reference point is determined, the synergistic tracker system generates the position of a previous target trackpoint in the current digitized image. The system generates a first estimated target trackpoint for the current digitized image by using the previous target trackpoint and a target velocity estimate. The target velocity estimate is a vector quantity denoting both estimated speed and estimated direction of motion of the target. The synergistic tracking system then centers a first estimated track gate on the first estimated target trackpoint. The information generated by the system from the correlation tracker's background reference point is then handed off to the object tracker for processing.

The object tracker continues tracking by operating on the portion of the current digitized image that is internal to the first estimated track gate. The object tracker generates a second precisely defined target trackpoint and target size information for the current digitized image. The tracker system uses the second precisely defined target trackpoint and the target size information to generate a second precisely defined track gate. The second precisely defined target trackpoint and the target size information generated by the object tracker are also used to define the reference region image for the correlation tracker. The information generated by the system from the object tracker's output is handed off to the correlation tracker for the processing of a subsequent digitized image. Since the correlation tracker's reference region image will be centered on the second precisely defined target trackpoint from the object tracker, non-zero-mean noise cannot accumulate in the correlation tracker's background reference point computation.

Turning now to FIG. I, there is shown a tracking system 5 for following and tracking a target 2 within a scene generally designated by the numeral 4. Various sensors can be used to sense information about scene 4. Typically, sensor 6 is of the type that receives radiated electromagnetic energy from scene 4 generating sensor data input 10 that is delivered to analog to digital (A/D) converter 20. A/D converter 20 generates digital data for compilation of a two dimensional digitized image that is used by an area correlation tracker (ACT) video processor or correlation tracker 30 and a gated video tracker (GVT) video processor or object tracker 40.

Timing and other control signals are provided to the components of tracking system 5 by clocking, timing and sequence control unit 120 and address control unit 130. Central processing unit (CPU) 70 coordinates the simultaneous operation of correlation tracker 30 and object tracker 40. Output converter 170 generates tracking error signals 80, as well as gate size and other signals 82.

Synergistic tracking system 5 begins operation when an operator initializes the system to a scene 4 and a target 2. External input 162 is used to receive initialization input from the operator. Sensor 6 begins sensing scene 4 and digital data is delivered from A/D 20 to correlation tracker 30. Reference memory 110 is initialized with a reference region image delivered from correlation memory 50 which stores a two dimensional digitized image compiled from digital data received from correlation tracker 30. The reference region image is used to process a subsequent digitized image. When the operator initializes the tracking system 5, a track gate is placed around the pixels representing target 2 in the digitized image.

The hardware details of the correlation tracker 30 and object tracker 40 are not necessary for the skilled practitioner to use this invention. Various correlation and video trackers are known in the art and would provide acceptable results; see, for example, Rue U.S. Pat. No. 4,719,584 et al and Fitts U.S. Pat. No. 4,133,004, all of which are hereby incorporated by reference.

Figure 2:
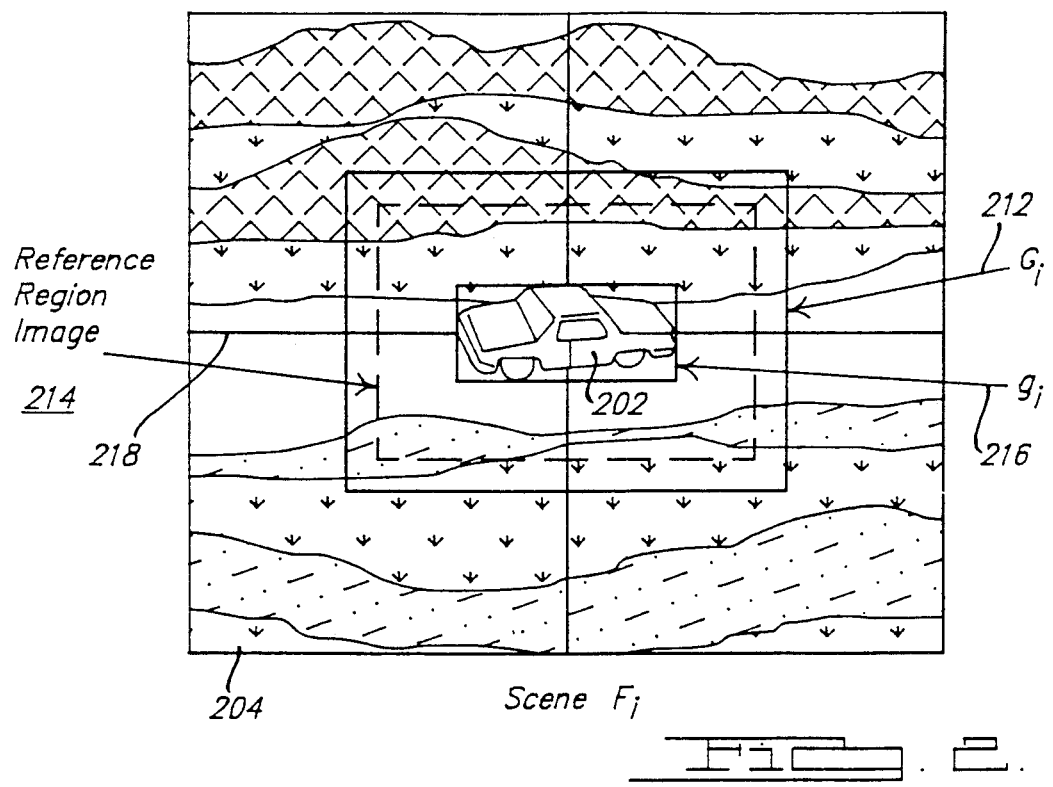
FIG. 2 illustrates digitized scene $F_i$ including a target, a track gate, a reference region image, and a larger gated image.

Turning now to FIG. 2, there is illustrated a hypothetical digitized image 204 with a target 202 representing scene $F_i$. The boundaries of digitized image 204 are defined by the field of view of the sensor. FIG. 2 represents the situation after the operator initializes the tracking system and also represents the situation after all processing on one digitized image in a series of images is completed. The sensor scans scene $F_i$ within its field of view. Scene $F_i$ is transformed into digitized image 204 and region 212 is stored as binarized image data in the correlation tracker memory 50 and the object tracker memory 60. Reference region image 214 is stored in the reference memory 110. Precisely defined track gate 216 and crosshairs 218 are centered on target 202 and the precisely defined target trackpoint by the output converter 170.

Figure 3:
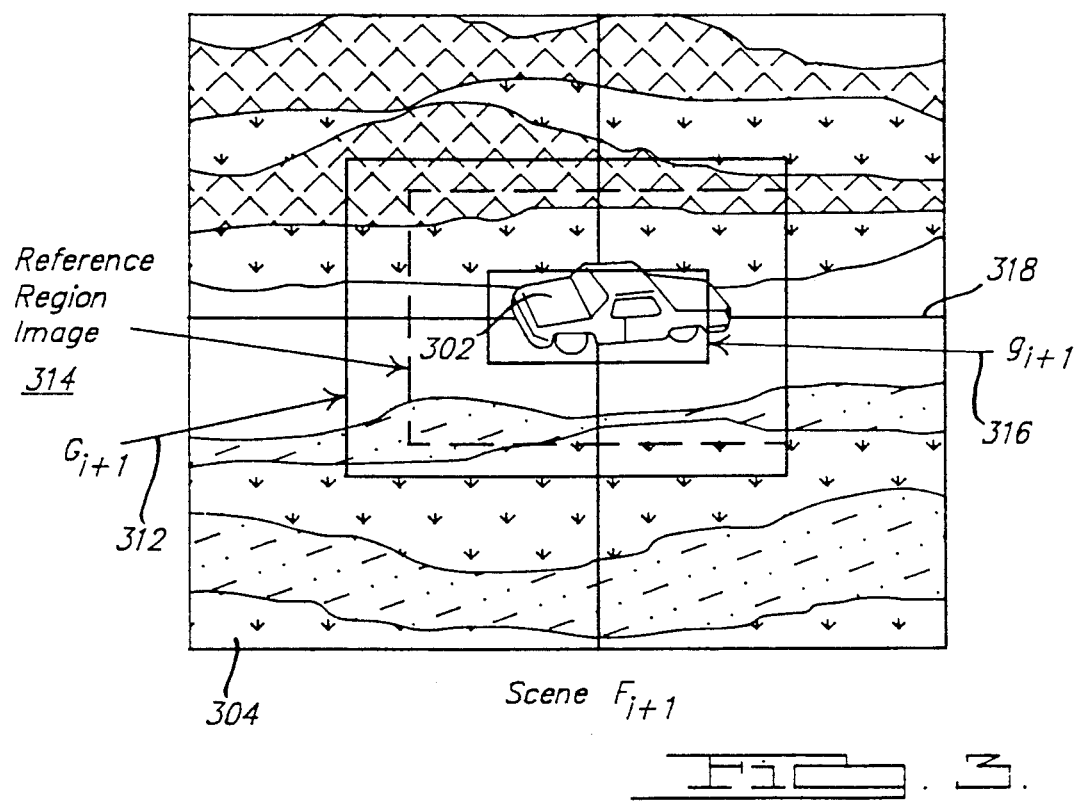
FIG. 3 illustrates digitized scene $F_{i+1}$, corresponding to the scene after the next sensor scan period, and includes sensor and target motion.

Turning now to FIG. 3, there is illustrated a hypothetical scene $F_{i+1}$ represented by digitized image 304 with a target 302. FIG. 3 illustrates a digitized image similar to that of FIG. 2 at a time equivalent to one sensor scan interval after digitized image 204 shown in FIG. 2. FIG. 3 includes motion downward and to the left by the sensor and motion upward and to the right by the target. As scene $F_{i+1}$ is scanned by the sensor in real time, the correlation tracker initiates a convolution by the convolver 90, of digitized image 304 and reference region image 214 of FIG. 2. The results of the convolution are used by the correlation tracker to generate a background reference point for digitized image 304. The background reference point denotes where in digitized image 304 the best match was found between reference region image 214 of FIG. 2 and digitized image 304.

The intersection of crosshairs 318 represents the location of the background reference point for digitized image 304. Track gate 316 is centered on crosshairs 318. Region 314 represents the portion of digitized image 304 that best matched with reference region image 214 of FIG. 2.

Observe that target 302 is no longer centered in track gate 316 because the correlation tracker 30 is tracking a reference region image within digitized image 304 and not target 302 itself. The correlation tracker 30 corrects for the motion of the sensor 6 illustrated in FIG. 3, by matching reference region image 214 of FIG. 2 to a portion of digitized image 304. Target 302 is no longer centered in track gate 316 because its position has changed between scene $F_i$ and scene $F_{i+1}$.

The CPU 70 generates a first estimated target trackpoint to account for the motion of target 302. The CPU calculates a target velocity estimate based on the target trackpoints from two previous digitized images. The precisely defined target trackpoint for digitized image 204 of FIG. 2 is denoted by the intersection of crosshairs 218 in FIG. 2, and the target trackpoint for the scene prior to $F_i$ of FIG. 2, is derived similarly. The synergistic tracking system includes a memory 140 for storing these previous target trackpoints. From these two previous target trackpoints a target velocity estimate can be found. The difference between the two previous target trackpoints represents the displacement of the target during the sensor scan time between two scenes.

The CPU 70 uses a previous target trackpoint determined in light of the background reference point, and the target velocity estimate to generate a first estimated target trackpoint in digitized image 304. First estimated track gate 316 shown in FIG. 3 is then translated and centered on the first estimated target trackpoint for use by the object tracker 40. Where target 302 is stationary between sensor scans relative to the background, first track gate 316 will remain centered on target 302 and will not be translated or moved within digitized image 304.

Figure 4:
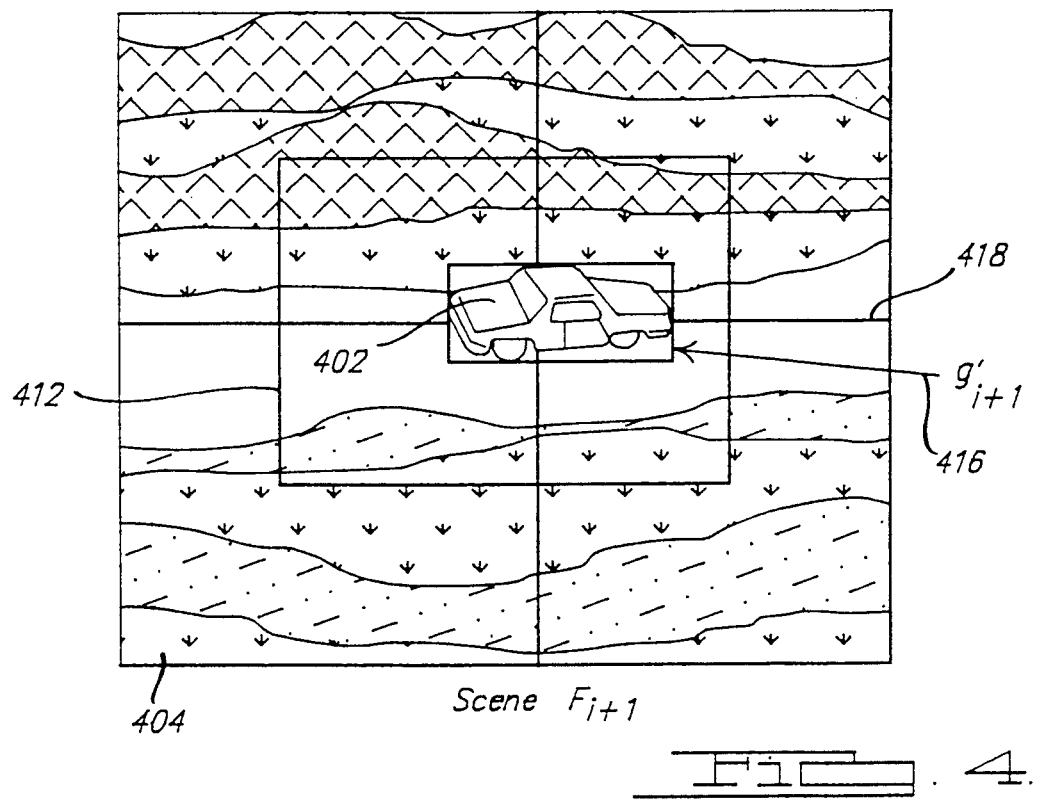
FIG. 4 shows the part of digitized scene $F_{i+1}$ which has been stored for the correlation and the object tracker.

Turning now to FIG. 4, there is illustrated the situation after the object tracker 40 has completed operations on scene $F_{i+1}$. The object tracker operates upon the digitized image bounded by first estimated track gate 416 that is centered on the first estimated target trackpoint, generated by the CPU 70 from the output of the correlation tracker 30. The object tracker 40 generates a second precisely defined target trackpoint and target size information for objects within estimated track gate 416.

A precisely defined target trackpoint is generated by producing the silhouette of the target within estimated track gate 416. The silhouette is generated by calculating a threshold value for data within estimated track gate 416 of scene $F_{i+1}$. The threshold value is applied to the data within estimated track gate 416 to generate a binarized silhouette of target 402. The process is known as segmentation to those skilled in the art.

Once a target silhouette is generated within estimated track gate 416, a precisely defined target trackpoint is generated for target 402 by object tracker 40. A precisely defined target trackpoint may be calculated using various algorithms including centroid or first moment calculation, area balancing or others, although centroid processing is presently preferred. The object tracker 40 also generates target size information for target 402. The target size information represents the size of target 2 in the digitized image generated from sensor 6. As sensor 6 moves closer to or farther from target 2, the perceived size of target 2 will expand or shrink, respectively, within the field of view of sensor 6.

The CPU 70 receives the precisely defined target trackpoint and target size information from the object tracker 40 and recenters track gate 416 on the precisely defined target trackpoint within digitized image 404. Target 402 will be centered in a precisely defined track gate after this relocation.

Figure 5:
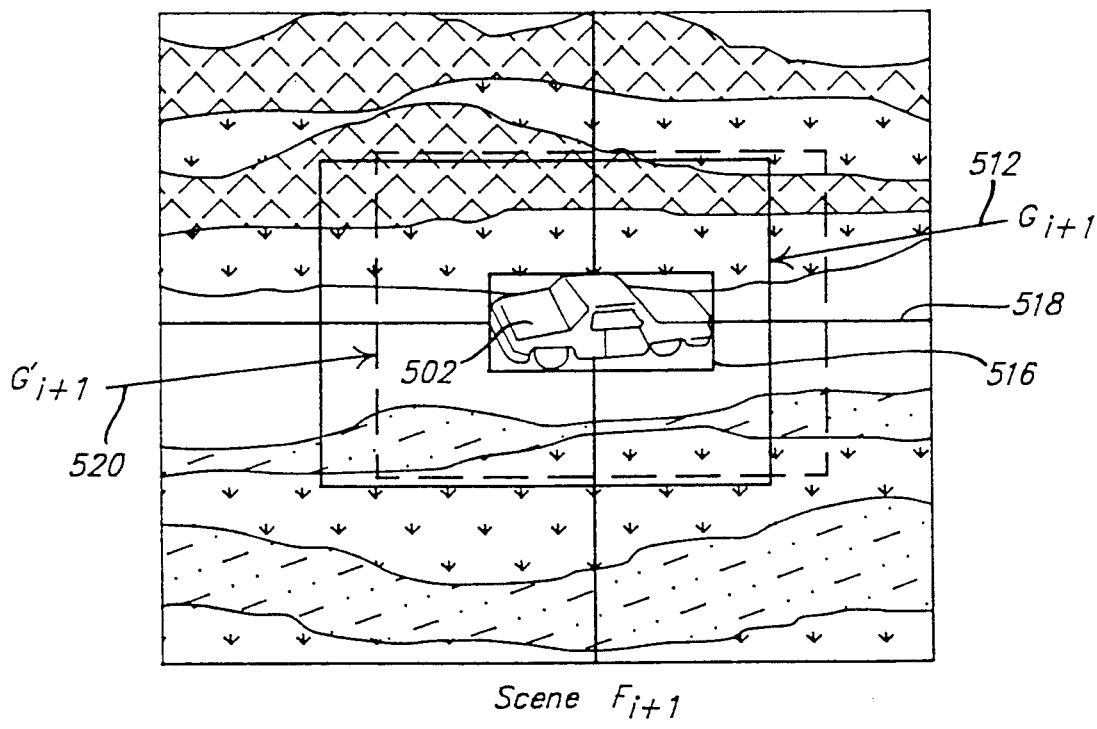
FIG. 5 illustrates the portions of digitized scene $F_{i+1}$ that will be used as a reference region image for digitized image $F_{i+2}$.

Turning now to FIG. 5, there is illustrated the situation when synergistic tracker operation on scene $F_{i+1}$ is complete. The CPU 70 has centered precisely defined track gate 516 and crosshairs 518 on the precisely defined target trackpoint of target 502. Region 520 is centered on the precisely defined target trackpoint and will be used to generate the reference region image that will be used in processing a subsequent digitized image. This reference region image will be centered on crosshairs 518 and will be stored in the reference memory 110. The synergistic tracker system 5 repeats the operations illustrated by FIG. 2 through FIG. 5 to track a target through a series of digitized images.

In the synergistic tracker system the correlation tracker provides advantages over tracking systems using object trackers independently by relaxing the line of sight following rate requirements of the object tracker. Relaxed requirements can be accomplished by using the correlation tracker's estimated target trackpoint for certain digitized images in the series of images that are processed. Where target velocity has been estimated, it is not necessary to require the object tracker to compute a precisely defined target trackpoint for every digitized image processed by the synergistic tracker.

Turning now to FIG. 6, there is illustrated the processing intervals of the two trackers in the synergistic tracker system. Time axis 610 is indexed with intervals of time of length (i). At each interval of axis 610 the correlation tracker generates an estimated target trackpoint for scene $F_N$. Shaded bars 620 indicate the length of time between subsequent object tracker computations of a precisely defined target trackpoint. Following each shaded bar 620 is an arrow 630 which indicates the interval when a precisely defined target trackpoint is available to the correlation tracker 30. The correlation tracker 30 may use the object tracker's 40 precisely defined target trackpoint to update its reference region image, at the intervals denoted by arrows 630.

As illustrated by FIG. 6, the lengths of bars 620 are not equal because the length of time required for the object tracker 40 to generate a precisely defined target trackpoint depends on the throughput capacity or speed of the object tracker 40 and the complexity of the digitized image within a track gate. While the object tracker 40 is performing its computation, the correlation tracker 30 uses an estimated target trackpoint given by $$\bar{U}_N = \bar{U}_{N-K} + K \cdot \bar{V}$$

to update its reference region image. In the equation above, $\bar{U}$ is a position vector, $\bar{V}$ is a velocity vector normalized to the scan interval (i), N is the index of the current image, and K is the number of intervals (i) which have elapsed since the last time the object tracker 40 was able to produce a precisely defined target trackpoint.

The operations of the object tracker 40 also affect the correlation tracker 30 in a salutary manner. The object tracker 40 makes it possible to update the correlation tracker's 30 reference region image with new data for each digitized image without introducing non-zero-mean noise or Brownian motion in the background reference point. The object tracker 40 substantially eliminates Brownian motion by generating a mathematically determined and precisely defined target trackpoint in the current digitized image which can be used as a center for a reference region image. In this manner, the synergistic tracker system 5 achieves more than a mere combination of an average of target trackpoints from two independently operating trackers. The synergistic tracker 5 provides substantially improved tracker tenacity beyond systems utilizing a mere average of the results of two trackers.

It should be understood that while this invention was described in connection with one particular example, that other modifications will become apparent to those skilled in the art after having the benefit of studying the specification, drawings and following claims.

What is claimed is:

1. A tracking system for tracking a target immersed in background clutter using as an input a sequence of two dimensional digitized images taken from a scene, said system comprising:
   correlation tracker means for matching a reference region image with a current digitized image and for generating a background reference point to be used for generating a first estimated track gate;
   means coupled to said correlation tracker means for processing said background reference point to generate a first estimated track gate;
   object tracker means for receiving said first estimated track gate from said means for processing, said object tracker means providing a second precisely defined target trackpoint and target size information; and
   means for using said second target trackpoint and said target size information from said object tracker means to redefine said reference region image for use by said correlation tracker means during processing of a subsequent digitized image.

2. The system of claim 1, wherein said system includes means for using said background reference point to find a previous target trackpoint in said current digitized image, said system using said previous target trackpoint and a target velocity estimate to generate a first estimated target trackpoint to be used in generating said first estimated track gate.

3. The system of claim 2, wherein said system includes means for calculating said target velocity estimate from two previous target trackpoints, said target velocity estimate being calculated from a displacement of said target between said two previous target trackpoints divided by a time between calculating said two previous target trackpoints.

4. The system of claim 2, wherein said system includes central processing unit means for centering said first estimated track gate on said first estimated target trackpoint generated from the output of said correlation tracker means.

5. The system of claim 1, wherein said object tracker means includes means for generating said second precisely defined target trackpoint as a function of a portion of said current digitized image bounded by said first estimated track gate.

6. The system of claim 5, wherein said system includes means for generating a track gate size from said target size information, and means for centering a second precisely defined track gate on said second precisely defined target trackpoint generated by said object tracker means.

7. A tracking system for tracking a target in a series of two dimensional digitized images taken from a scene, said system comprising:
   correlation processor means for matching a reference region image with a current digitized image and for generating a background reference point to be used in generating a first estimated track gate;
   storage means connected to the correlation processor means for storing the first estimated track gate generated from the output of the correlation processor means;
   centroid processor means connected to the storage means for receiving the first estimated track gate, said centroid processor means generating a second precisely defined target trackpoint and target size information to be used in generating a second precisely defined track gate, said second track gate being stored in said storage means; and
   means for using said second target trackpoint from the centroid processor means to redefine the reference region image for use by the correlation processor means during processing of a subsequent digitized image.

8. The system of claim 7, wherein said system includes means for generating a first estimated target trackpoint from said background reference point, said first estimated target trackpoint to be used in generating said first estimated track gate.

9. The system of claim 8, wherein said system includes means for using said background reference point to find a previous target trackpoint in said current digitized image, said system using said previous target trackpoint and, a target velocity estimate to generate said first estimated target trackpoint to be used in generating said first estimated track gate.

10. The system of claim 9, wherein said system includes means for calculating said target velocity estimate from two previous target trackpoints, said target velocity estimate being calculated from a displacement of said target between said two previous target trackpoints divided by a time between calculating said two previous target trackpoints.

11. The system of claim 9, wherein said system includes central processing unit means for centering said first estimated track gate on said first estimated target trackpoint generated from the output of said correlation processor means, and means for centering said second precisely defined track gate on said second precisely defined target trackpoint generated by said centroid processor means.

12. The system of claim 7, wherein said centroid processor means generates said second precisely defined target trackpoint as a function of a portion of said current digitized image within said first estimated track gate previously generated from said output of the correlation processor means.

13. The system of claim 12 wherein said system includes means for generating a track gate size from said target size information.

14. A method of tracking a target immersed in background clutter using as an input a sequence of two dimensional digitized images, said method comprising the steps of:
(a) generating a background reference point for a current digitized image by using a correlation tracker to match a reference region image with said current digitized image, said background reference point to be used for generating a first estimated track gate;
(b) generating a second precisely defined target trackpoint and target size information by using an object tracker to receive said first estimated track gate as an input; and
(c) redefining said reference region image, for use by said correlation tracker during processing of a subsequent digitized image, by using said second precisely defined target trackpoint and said target size information from said object tracker.

15. The method of claim 14 wherein step (a) includes generating a first estimated target trackpoint by using said background reference point from said correlation tracker to find a previous target trackpoint in said current digitized image, said previous target trackpoint to be used with a target velocity estimate to interpolate said first estimated target trackpoint from said previous target trackpoint.

16. The method of claim 15, including the step of calculating said target velocity estimate from two previous target trackpoints, said target velocity estimate being calculated from a displacement of said target between said two previous target trackpoints divided by a time between calculating said two previous target trackpoints.

17. The method of claim 15, including the step of centering said first estimated track gate on said first estimated target trackpoint generated from the output of said correlation tracker.

18. The method of claim 14, wherein step (b) includes centering a second precisely defined track gate on said second precisely defined trackpoint generated by said object tracker.

19. The method of claim 18, including the step of generating said second precisely defined target trackpoint and said target size information by using said object tracker to receive and to operate upon a portion of said current digitized image bounded by said first estimated track gate.

20. The method of claim 18 including the step of generating a track gate size from said target size information.

* * * * *